(12) United States Patent
Zhou (10) Patent No.: US 12,135,481 B2
(45) Date of Patent: Nov. 5, 2024

(54) DISPLAY PANEL AND ELECTRONIC DISPLAY DEVICE

(71) Applicant: TCL CHINA STAR OPTOELECTRONICS TECHNOLOGY CO., LTD., Shenzhen (CN)

(72) Inventor: Ying Zhou, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/607,887

(22) PCT Filed: Sep. 27, 2021

(86) PCT No.: PCT/CN2021/120813
§ 371 (c)(1),
(2) Date: Oct. 31, 2021

(87) PCT Pub. No.: WO2023/044885
PCT Pub. Date: Mar. 30, 2023

(65) Prior Publication Data
US 2024/0027844 A1    Jan. 25, 2024

(30) Foreign Application Priority Data
Sep. 22, 2021   (CN) .......................... 202111108671.6

(51) Int. Cl.
*G02F 1/1339*     (2006.01)
*G02F 1/1333*     (2006.01)
*G02F 1/1335*     (2006.01)
*G02F 1/1343*     (2006.01)
*G02F 1/1345*     (2006.01)

(52) U.S. Cl.
CPC .... *G02F 1/13392* (2013.01); *G02F 1/133345* (2013.01); *G02F 1/133512* (2013.01); *G02F 1/1339* (2013.01); *G02F 1/134309* (2013.01); *G02F 1/13458* (2013.01); *G02F 1/133514* (2013.01)

(58) Field of Classification Search
CPC ............... G02F 1/1339; G02F 1/13392; G02F 1/133512; G02F 1/13458; G02F 1/133345
See application file for complete search history.

(56) References Cited

U.S. PATENT DOCUMENTS

2010/0045912 A1* 2/2010 Chen .................. G02F 1/13394
349/190

* cited by examiner

*Primary Examiner* — Jessica M Merlin
(74) *Attorney, Agent, or Firm* — The Roy Gross Law Firm, LLC; Roy Gross (57) ABSTRACT

The present invention is related to a display panel and an electronic display device. The present invention adds a second metal layer in a transfer pad region, so an upper surface of a second insulating layer in a bus line region is flush with an upper surface of the second insulating layer in the transfer pad region. In addition, a distance between the upper surface of the second insulating layer in the bus line region and an upper surface of a first substrate is less than a distance between a highest point of an upper surface of a first electrode layer in the transfer pad region and the upper surface of the first substrate.

14 Claims, 5 Drawing Sheets

DISPLAY PANEL AND ELECTRONIC DISPLAY DEVICE

CROSS REFERENCE TO RELATED APPLICATIONS

This application is a National Phase of PCT Patent Application No. PCT/CN2021/120813 having International filing date of Sep. 27, 2021, which claims the benefit of priority of Chinese Application No. 202111108671.6 filed on Sep. 22, 2021. The contents of the above applications are all incorporated by reference as if fully set forth herein in their entirety.

FIELD OF INVENTION

The present invention is related to the field of display technology and specifically to a display panel and an electronic display device.

BACKGROUND OF INVENTION

Currently, signals on an array substrate side are generally conducted to a color filter substrate side through conductive balls, so that there is a certain voltage difference between electrodes on the array substrate side and the color filter substrate side, which causes liquid crystal molecules to flip. The current conductive balls are designed in two ways. A first method is to dispense glue, which is mainly to dispose the conductive balls in a transfer pad region. In order to ensure sufficient conduction between the electrodes on the array substrate side and the color filter substrate side, a size of the transfer pad region needs to be large, generally 900 μm*900 μm. An important feature of an ultra-narrow bezel electronic display device is that a bezel size is small, so the first method is not very practical for the ultra-narrow bezel electronic display device. A second method is to uniformly mix the conductive balls into a sealant according to a certain ratio, so that there will be the conductive balls where the sealant is coated. The second method can reduce a width of the transfer pad region to a certain extent, thereby achieving an effect of a narrow bezel.

Figure 1:
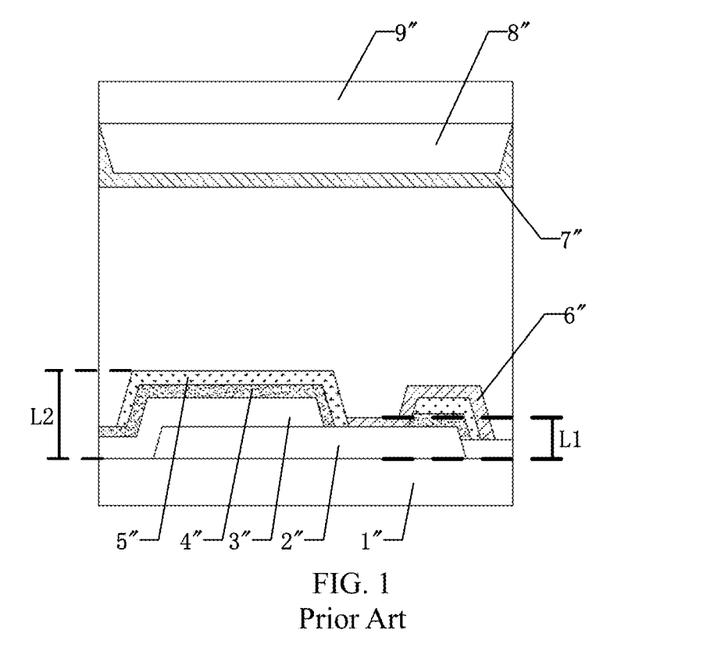
FIG. 1 is a structural schematic diagram of a sealant region of the display panel of prior art.

As shown in FIG. 1, when the conductive balls are designed with the second method, the transfer pad region is mainly configured to realize an electrical connection between a first electrode layer 6" and a first metal layer 2" through a through hole on a second insulating layer 5", and a conduction between the first electrode layer 6" and the second electrode layer 7" is realized through the conductive balls in the sealant. In this manner, a distance L1 between an upper surface of the first electrode layer 6" at the through hole and an upper surface of a first substrate 1" is a sum of film thicknesses of the first metal layer 2" and the first electrode layer 6". A distance L2 between an upper surface of the second insulating layer 5" in a bus line region and an upper surface of the first substrate 1" is a sum of film thicknesses of the first metal layer 2", a first insulating layer 3", a passivation layer 4", and the second insulating layer 5", and L2 is greater than L1. Since the film thickness of the second insulating layer 5" ranges from 1.3 μm to 1.8 μm, a difference between L1 and L2 is relatively large.

Figure 2:
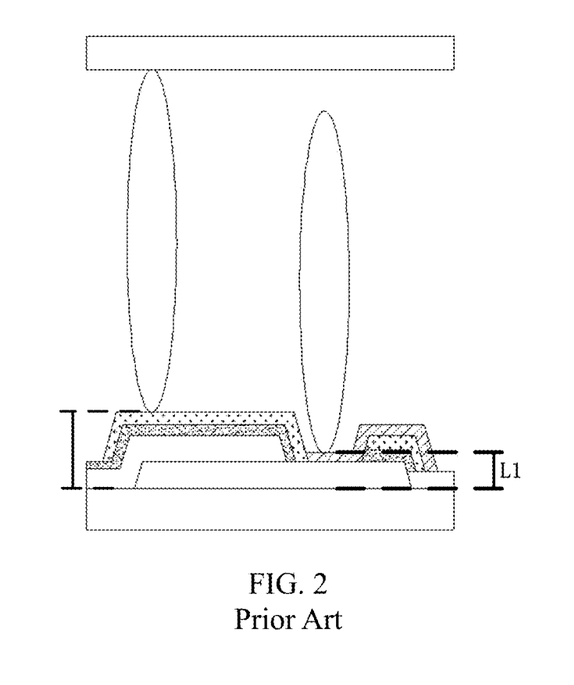
FIG. 2 is a first diagram showing an effect of conductive balls in the sealant region after an array substrate and a color filter substrate in the prior art are assembled into a cell.

As shown in FIG. 2, since L1 is less than L2, and the difference between L1 and L2 is relatively large, if a diameter of each of the conductive balls is determined according to a distance between the upper surface of the second insulating layer 5" and a lower surface of the second electrode layer 7" in the bus line region before the array substrate and the color film substrate are assembled into a cell, the conductive balls in the transfer pad region still cannot conduct the first electrode layer 6" and the second electrode layer 7" in the transfer pad region after the array substrate and the color film substrate are assembled into the cell when the conductive balls in the bus line region have been compressed.

Figure 3:
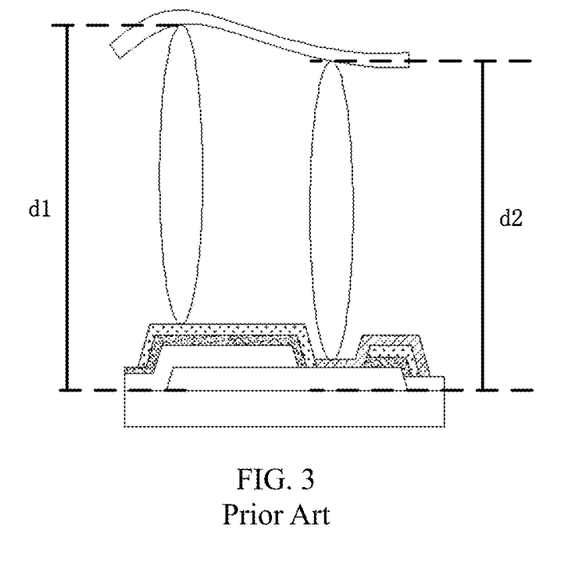
FIG. 3 is a second diagram showing an effect of the conductive balls in the sealant region after the array substrate and the color filter substrate in the prior art are assembled into the cell.

As shown in FIG. 3, since L1 is less than L2, and the difference between L1 and L2 is relatively large, if the diameter of each of the conductive balls is determined according to a distance between a distance between the upper surface of the first electrode layer 6" and the lower surface of the second electrode layer 7" at the through hole in the transfer pad region before the array substrate and the color film substrate are assembled into the cell, the conductive balls in the bus line region still cause the second electrode layer 7", a light-shielding layer 8" and a second substrate 9" in the bus line region to be raised after the array substrate and the color film substrate are assembled into the cell when the conductive balls in the bus line region have been compressed. As a result, a film thickness d1 between the upper surface of the first substrate 1" and a lower surface of the second substrate 9" in the bus line region is greater than a film thickness d2 between the upper surface of the first substrate 1" and the lower surface of the second substrate 9" in the transfer pad region. A liquid crystal transmittance formula is:

$$T = \frac{1}{2}\sin^2\theta\sin^2 2\psi\sin^2\frac{\pi\Delta nd}{\lambda}.$$

It can be seen from the above formula that the greater d, the greater the transmittance T. Since d1 of the bus line region is greater than d2, a film thickness between the upper surface of the first substrate 1" and the lower surface of the second substrate 9" in the display region of the display panel is equal to the film thickness d2 between the upper surface of the first substrate 1" and the lower surface of the second substrate 9" in the transfer pad region. Therefore, the film thickness d1 between the upper surface of the first substrate 1" and the lower surface of the second substrate 9" in the bus line region is greater than the film thickness between the upper surface of the first substrate 1" and the lower surface of the second substrate 9" in the display region of the display panel. This causes a liquid crystal transmittance of the bus line region to be greater than a liquid crystal transmittance of the display region, and a brightness of the bus line region is greater than a brightness of the display region. As a result, mura occurs to a sealant region, and a light leakage problem occurs to the sealant region.

SUMMARY OF INVENTION

A purpose of the present invention is to provide a display panel and an electronic display device to solve a light leakage problem in a current display panel.

In order to solve the above problem, the present invention provides a display panel, which includes a sealant region. The sealant region includes a transfer pad region and a non-transfer pad region, and the non-transfer pad region includes a bus line region. The display panel further includes: a first substrate positioned in the sealant region; a first metal layer disposed on a side surface of a first substrate and positioned in the transfer pad region and the bus line region; a first insulating layer disposed on a side surface of the first metal layer away from the first substrate and extending to cover the first substrate, wherein a position of the first insulating layer corresponding to the first metal layer is defined with at least one first through hole; a second metal layer disposed on a side surface of the first insulating layer in the transfer pad region away from the first substrate and electrically connected to the first metal layer through the first through hole; a second insulating layer disposed on a side surface of the second metal layer away from the first substrate and extending to cover the first insulating layer, wherein a position of the second insulating layer corresponding to the second metal layer is defined with at least one second through hole; and a first electrode layer disposed on a side surface of the second insulating layer in the transfer pad region away from the first substrate and electrically connected to the second metal layer through the second through hole.

Furthermore, a gap is formed between a projection of the first through hole on the first substrate and a projection of the second through hole on the first substrate.

Furthermore, a distance between an upper surface of the second insulating layer in the bus line region and an upper surface of the first substrate is less than a maximum distance between an upper surface of the first electrode layer in the transfer pad region and the upper surface of the first substrate.

Furthermore, the display panel further includes: a second substrate disposed opposite to the first substrate and positioned on a side of the first electrode layer away from the first substrate; a light-shielding layer disposed on a side surface of the second substrate adjacent to the first substrate; and a second electrode layer disposed on a side surface of the light-shielding layer adjacent to the first substrate.

Furthermore, the display panel further includes a sealant disposed between the first electrode layer and the second electrode layer. The sealant includes a plurality of conductive balls, and a diameter of each of the conductive balls is equal to a minimum distance between the first electrode layer and the second electrode layer.

Furthermore, a thickness of the second metal layer ranges from 0.5 μm to 0.75 μm.

Furthermore, a thickness of the first electrode layer ranges from 0.08 μm to 0.15 μm.

Furthermore, an upper surface of the second insulating layer in the bus line region is flush with an upper surface of the second insulating layer in the transfer pad region.

Furthermore, the display panel further includes a passivation layer disposed between the second metal layer and the second insulating layer and extending to cover the first insulating layer. The passivation layer is defined with at least one third through hole corresponding to the second through hole.

In order to solve the above problem, the present invention provides an electronic display device, which includes the display panel of the present invention.

The present invention adds the second metal layer between the first insulating layer and the second insulating layer in the transfer pad region, so the upper surface of the second insulating layer in the bus line region is flush with the upper surface of the second insulating layer in the transfer pad region. In addition, a distance between the upper surface of the second insulating layer in the bus line region and the upper surface of the first substrate is less than a distance between a highest point of the upper surface of the first electrode layer in the transfer pad region and the upper surface of the first substrate. Therefore, a height difference between the highest point of the upper surface of the first electrode layer in the transfer pad region and the upper surface of the second insulating layer in the bus line region is only the thickness of the first electrode layer, and the thickness of the first electrode layer ranges from 0.08 μm to 0.15 μm. Compared with the prior art, the present invention reduces the height difference between the highest point of the upper surface of the first electrode layer in the transfer pad region and the upper surface of the second insulating layer in the bus line region, and the diameter of each of the conductive balls is equal to a distance between the highest point of the first electrode layer and the second electrode layer, thereby preventing the light leakage problem of the bus line region in the prior art.

DESCRIPTION OF DRAWINGS

In order to describe technical solutions in the present invention or prior art clearly, drawings to be used in the description of embodiments will be described briefly below. Obviously, drawings described below are only for some embodiments of the present invention, and other drawings can be obtained by those skilled in the art based on these drawings without creative efforts.

REFERENCE SIGNS display panel 100,
display region 101, sealant region 102,
transfer pad region 1021, non-transfer pad region 1022,
bus line region 10221,
first substrate 1, first metal layer 2,
first insulating layer 3, passivation layer 4,
second insulating layer 5, first electrode layer 6,
second electrode layer 7, light-shielding layer 8,
second substrate 9, second metal layer 10,
sealant 11, first through hole 12,
second through hole 13, third through hole 14, and
conductive balls 15.

DETAILED DESCRIPTION OF EMBODIMENTS

A preferred embodiment of the present invention will be introduced with reference to appended drawings as follows to completely introduce technical solutions of the present invention to those skilled in the art and to prove that the present invention can be implemented. Therefore, the technical solutions disclosed by the present invention is clearer, making it easier for those skilled in the art to understand how to implement the present invention. The present invention can be embodied in many different forms of embodiment, and the scope of protection of the present invention is not limited to the embodiments set forth herein. The description of the following examples is not intended to limit the scope of the present invention.

Direction terms mentioned by the present invention, for example "upper," "lower," "front," "rear," "left," "right," "inner," "outer," "side," etc. are merely directions in the appended drawings for only explaining and illustrating the present invention. The directional terms used herein are used to explain and illustrate the present invention, not to limit the scope of protection of the present invention.

In the appended drawings, structurally identical components are designated by the same reference numerals, and structurally or functionally similar components throughout are designated by similar numerical reference numerals. The dimensions and thicknesses of each component shown in the drawings are arbitrarily shown. The size and thickness of each component are not limited, and for the sake of clarity, the thickness of the components is exaggerated somewhat in some places in the drawings.

The present invention provides an electronic display device, which includes a display panel 100. The electronic display device includes mobile phones, computers, MP3, MP4, tablet computers, TVs or digital cameras, etc.

Figure 4:
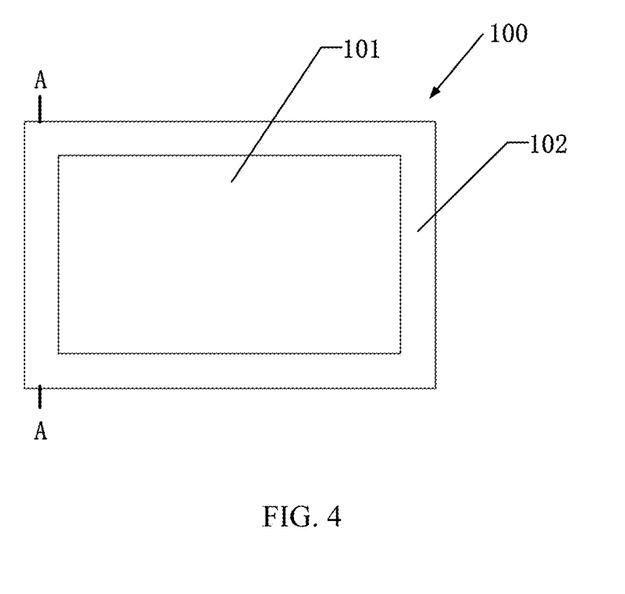
FIG. 4 is a plane view of a display panel of the present invention.

As shown in FIG. 4, the present invention provides a display panel 100. The display panel 100 includes a display region 101 and a sealant region 102 surrounding the display region 101.

Figure 5:
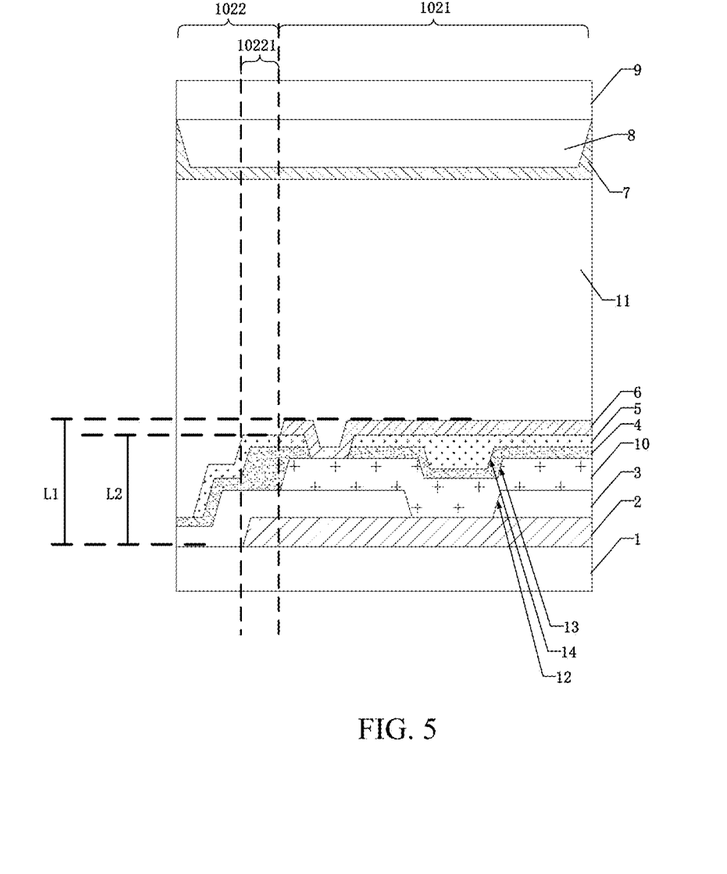
FIG. 5 is a cross-sectional view of a sealant region of the display panel shown in FIG. 4 taken along line A-A.

As shown in FIG. 5, the sealant region 102 includes a transfer pad region 1021 and a non-transfer pad region 1022, and the non-transfer pad region 1022 includes a bus line region 10221.

Figure 6:
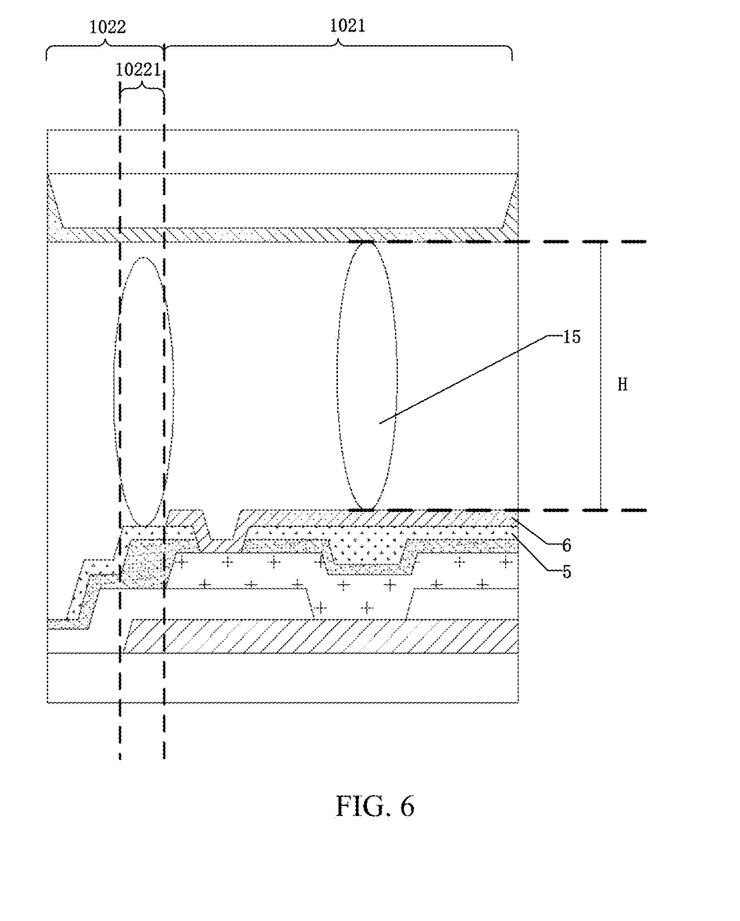
FIG. 6 is a diagram showing an effect of conductive balls in the sealant region before an array substrate and a color filter substrate of the present invention are assembled into a cell.
Figure 7:
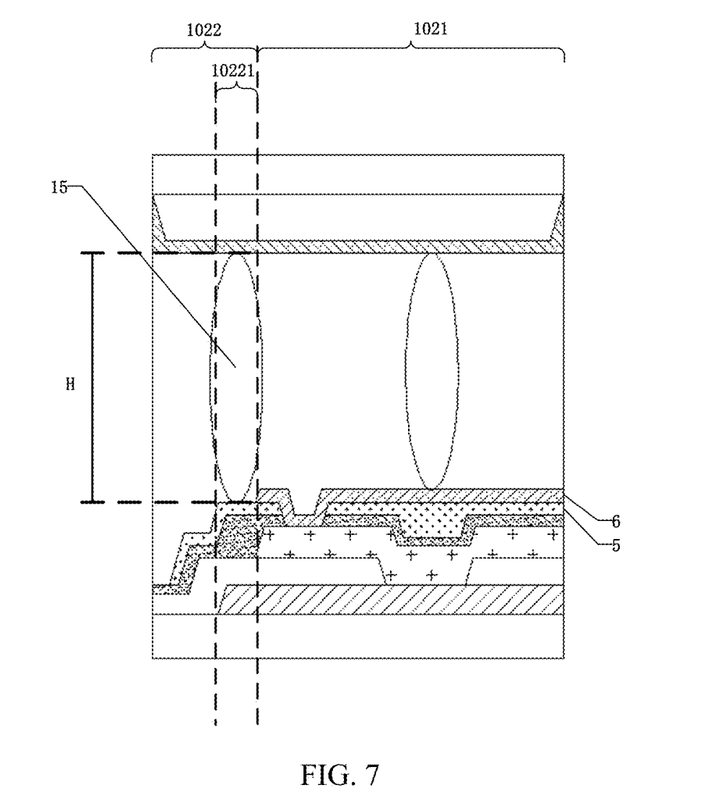
FIG. 7 is a diagram showing an effect of the conductive balls in the sealant region after the array substrate and the color filter substrate of the present invention are assembled into the cell.

As shown in FIGS. 5, 6, and 7, the display panel 100 includes a first substrate 1, a first metal layer 2, a first insulating layer 3, a second metal layer 10, a passivation layer 4, a second insulating layer 5, a first electrode layer 6, a second electrode layer 7, a light-shielding layer 8, a second substrate 9, and a sealant 11.

The first substrate 1 is positioned in the sealant region 102. Specifically, the first substrate 1 can extend to the display region 101 as a base of an array substrate side. A material of the first substrate 1 includes one or more of glass, silicon dioxide, polyester resin, polyethylene, polypropylene, polystyrene, polylactic acid, polyethylene terephthalate, polyimide or polyurethane.

The first metal layer 2 is disposed on a side surface of the first substrate 1 and is positioned in the transfer pad region 1021 and the bus line region 10221. In this embodiment, a material of the first metal layer 2 is copper. In another embodiment, the material of the first metal layer 2 can be other metals such as molybdenum. A thickness of the first metal layer 2 ranges from 0.5 μm to 0.75 μm. In this embodiment, the thickness of the first metal layer 2 is 0.75 μm.

The first insulating layer 3 is disposed on a side surface of the first metal layer 2 away from the first substrate 1 and extends to cover the first substrate 1. The first insulating layer 3 is mainly configured to prevent the coupling phenomenon from occurring between the first metal layer 2 and the second metal layer 10. A material of the first insulating layer 3 includes one or more of SiO2 and SiNx. A thickness of the first insulating layer 3 ranges from 0.45 μm to 0.52 μm. In this embodiment, the thickness of the first insulating layer 3 is 0.52 μm.

The first insulating layer 3 is defined with at least one first through hole 12 at a position corresponding to the first metal layer 2. The first through hole 12 is mainly configured to conduct the first metal layer 2 and the second metal layer 10. In this embodiment, an electrical connection effect between the first metal layer 2 and the second metal layer 10 can be enhanced by a plurality of the first through holes 12, so as to prevent one of the first through holes 12 from conducting abnormally and causing signals to fail to be transmitted between the first metal layer 2 and the second metal layer 10.

The second metal layer 10 is disposed on a side surface of the first insulating layer 3 in the transfer pad region 1021 away from the first substrate 1 and is electrically connected to the first metal layer 2 through the first through hole 12. In this embodiment, a material of the second metal layer 10 is copper. In another embodiment, the material of the second metal layer 10 can be other metals such as molybdenum. A thickness of the second metal layer 10 ranges from 0.5 μm to 0.75 μm. In this embodiment, the thickness of the second metal layer 10 is 0.75 μm.

The passivation layer 4 is disposed on a side surface of the second metal layer 10 away from the first substrate 1 and extends to cover the first insulating layer 3. A thickness of the passivation layer 4 ranges from 0.1 μm to 0.3 μm. In this embodiment, the thickness of the passivation layer 4 is 0.2 μm.

The second insulating layer 5 is disposed on a side surface of the passivation layer 4 away from the first substrate 1. A material of the second insulating layer 5 is perfluoroalkoxy alkane (PFA). A thickness of the second insulating layer 5 ranges from 1.3 μm to 1.8 μm. On the one hand, the second insulating layer 5 can prevent the coupling phenomenon from occurring between the first electrode layer 6 and the second metal layer 10. On the other hand, the second insulating layer 5 also has a flattening effect, so that an upper surface of the second insulating layer 5 in the bus line region 10221 is flush with an upper surface of the second insulating layer 5 in the transfer pad region 1021.

The second insulating layer 5 is defined with at least one second through hole 13 at a position corresponding to the second metal layer 10. The passivation layer 4 is defined with at least one third through hole 14. The third through hole 14 corresponds to the second through hole 13, so as to enable electrical connection between the first electrode layer 6 and the second metal layer 10. In this embodiment, a plurality of the second through holes 13 and a plurality of the third through holes 14 can enhance the electrical connection effect between the first electrode layer 6 and the second metal layer 10 and prevent one of the second through holes 13 and one of the third through holes 14 from conducting abnormally and causing signals to fail to be transmitted between the second metal layer 10 and the first electrode layer 6.

Figure 8:
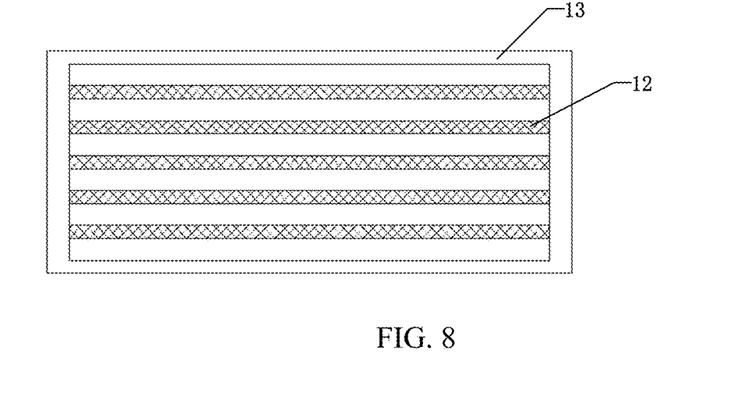
FIG. 8 is a schematic diagram showing projections of a first through hole and a second through hole on a substrate.

As shown in FIG. 8, due to a low precision of a current process, in order to prevent the electrical connections between the first electrode layer 6, the second metal layer 10, and the first metal layer 2 from abnormality when the first through hole 12 and the second through hole are correspondingly arranged, there is a gap between a projection of the first through hole 12 on the first substrate 1 and a projection of the second through hole 13 on the first substrate 1 in this embodiment. In other words, the first through hole 12 and the second through hole 13 are staggered.

The first electrode layer 6 is disposed on a side surface of the second insulating layer 5 in the transfer pad region 1021 away from the first substrate 1 and is electrically connected to the second metal layer 10 through the second through hole 13 and the third through hole 14. A thickness of the first electrode layer 6 ranges from 0.08 μm to 0.15 μm. In this embodiment, the thickness of the first electrode layer 6 is 0.13 μm. In this embodiment, a material of the first electrode layer 6 is indium tin oxide (ITO).

The second substrate 9 is disposed opposite to the first substrate 1 and is positioned on a side of the first electrode layer 6 away from the first substrate 1. The second substrate 9 is positioned in the sealant region. Specifically, the second substrate 9 can extend to the display region 101 as a base of a color filter substrate side. A material of the second substrate 9 includes one of more of glass, silicon dioxide, polyester resin, polyethylene, polypropylene, polystyrene, polylactic acid, polyethylene terephthalate, polyimide, or polyurethane.

The light-shielding layer 8 is disposed on a side surface of the second substrate 9 adjacent to the first substrate 1. The light-shielding layer 8 is mainly configured to prevent a light leakage problem.

The second electrode layer 7 is disposed on a side surface of the light-shielding layer 8 adjacent to the first substrate 1. In this embodiment, a material of the second electrode layer 7 is indium tin oxide (ITO).

The sealant 11 is disposed between the first electrode layer 6 and the second electrode layer 7. A plurality of conductive balls 15 are provided in the sealant 11. The conductive balls 15 are uniformly mixed in the sealant 11 according to a certain ratio, so there will be the conductive balls 15 where the sealant 11 is coated. In this way, a width of the transfer pad region 1021 can be reduced to a certain extent, thereby achieving an effect of a narrow bezel.

A diameter of each of the conductive balls 15 is equal to a minimum distance H between the first electrode layer 6 and the second electrode layer 7. In other words, the diameter of each of the conductive balls is determined according to a highest point of the first electrode layer 6 in the transfer pad region 1021 before the array substrate and the color filter substrate are assembled into a cell. Specifically, a distance between the highest point of the first electrode layer 6 and a lower surface of the second electrode layer 7 in the transfer pad region 1021 before the array substrate and the color filter substrate are assembled into a cell is equal to the diameter of each of the conductive balls 15.

Since the upper surface of the second insulating layer 5 in the bus line region 10221 is flush with the upper surface of the second insulating layer 5 in the transfer pad region 1021, a distance L2 between the upper surface of the second insulating layer 5 in the bus line region 10221 and an upper surface of the first substrate 1 is less than a distance L1 between a highest point of an upper surface of the first electrode layer 6 in the transfer pad region 1021 and the upper surface of the first substrate 1. Therefore, when the conductive balls 15 are at the bus line region 10221, the second electrode layer 7, the light-shielding layer 8, and the second substrate 9 will not be raised, thereby preventing the light leakage problem of the bus line region 10221.

In summary, this embodiment adds the second metal layer 10 between the first insulating layer 3 and the second insulating layer 5 in the transfer pad region 1021, so the upper surface of the second insulating layer 5 in the bus line region 10221 is flush with the upper surface of the second insulating layer 5 in the transfer pad region 1021. In addition, the distance L2 between the upper surface of the second insulating layer 5 in the bus line region 10221 and the upper surface of the first substrate 1 is less than the distance L1 between the highest point of the upper surface of the first electrode layer 6 in the transfer pad region 1021 and the upper surface of the first substrate 1. Therefore, a height difference between the highest point of the upper surface of the first electrode layer 6 in the transfer pad region 1021 and the upper surface of the second insulating layer 5 in the bus line region 10221 is only the thickness of the first electrode layer 6, and the thickness of the first electrode layer 6 is 0.13 μm. Compared with the prior art, the present invention reduces the height difference between the highest point of the upper surface of the first electrode layer 6 in the transfer pad region 1021 and the upper surface of the second insulating layer 5 in the bus line region 10221, and the diameter of each of the conductive balls 15 is equal to the distance H between the highest point of the first electrode layer 6 in the transfer pad region 1021 and the lower surface of the second electrode layer 7 before the array substrate and the color filter substrate are assembled into the cell, thereby preventing the light leakage problem of the bus line region 10221 in the prior art.

The display panel and electronic display device provided by the present invention is described in detail above, the specific examples of this document are used to explain principles and embodiments of the present invention, and the description of embodiments above is only for helping to understand the present invention. Meanwhile, those skilled in the art will be able to change the specific embodiments and the scope of the present invention according to the idea of the present invention. In the above, the content of the specification should not be construed as limiting the present invention. Above all, the content of the specification should not be the limitation of the present invention.

What is claimed is:

1. A display panel, comprising:
   a sealant region comprising a transfer pad region and a non-transfer pad region, wherein the non-transfer pad region comprises a bus line region;
   a first substrate positioned in the sealant region;
   a first metal layer disposed on a side surface of a first substrate and positioned in the transfer pad region and the bus line region;
   a first insulating layer disposed on a side surface of the first metal layer away from the first substrate and extending to cover the first substrate, wherein a position of the first insulating layer corresponding to the first metal layer is defined with at least one first through hole;
   a second metal layer disposed on a side surface of the first insulating layer in the transfer pad region away from the first substrate and electrically connected to the first metal layer through the first through hole;
   a second insulating layer disposed on a side surface of the second metal layer away from the first substrate and extending to cover the first insulating layer, wherein a position of the second insulating layer corresponding to the second metal layer is defined with at least one second through hole, and an upper surface of the second insulating layer in the transfer pad region is flush with an upper surface of the second insulating layer in the bus line region; and
   a first electrode layer disposed and extending continuously on a side surface of the second insulating layer in the transfer pad region away from the first substrate and electrically connected to the second metal layer through the second through hole, wherein a distance between an upper surface of the second insulating layer in the bus line region and an upper surface of the first substrate is less than a maximum distance between an upper surface of the first electrode layer in the transfer pad region and the upper surface of the first substrate.

2. The display panel according to claim 1, wherein a gap is formed between a projection of the first through hole on the first substrate and a projection of the second through hole on the first substrate.

3. The display panel according to claim 1, further comprising:
   a second substrate disposed opposite to the first substrate and positioned on a side of the first electrode layer away from the first substrate;
   a light-shielding layer disposed on a side surface of the second substrate adjacent to the first substrate; and
   a second electrode layer disposed on a side surface of the light-shielding layer adjacent to the first substrate.

4. The display panel according to claim 3, further comprising:
   a sealant disposed between the first electrode layer and the second electrode layer, wherein the sealant comprises a plurality of conductive balls, and a diameter of each of the conductive balls is equal to a minimum distance between the first electrode layer and the second electrode layer.

5. The display panel according to claim 1, wherein a thickness of the second metal layer ranges from 0.5 µm to 0.75 µm.

6. The display panel according to claim 1, wherein a thickness of the first electrode layer ranges from 0.08 µm to 0.15 µm.

7. The display panel according to claim 1, further comprising:
   a passivation layer disposed between the second metal layer and the second insulating layer and extending to cover the first insulating layer, wherein the passivation layer is defined with at least one third through hole corresponding to the second through hole.

8. An electronic display device, comprising a display panel, wherein the display panel comprises:
   a sealant region comprising a transfer pad region and a non-transfer pad region, wherein the non-transfer pad region comprises a bus line region;
   a first substrate positioned in the sealant region;
   a first metal layer disposed on a side surface of a first substrate and positioned in the transfer pad region and the bus line region;
   a first insulating layer disposed on a side surface of the first metal layer away from the first substrate and extending to cover the first substrate, wherein a position of the first insulating layer corresponding to the first metal layer is defined with at least one first through hole;
   a second metal layer disposed on a side surface of the first insulating layer in the transfer pad region away from the first substrate and electrically connected to the first metal layer through the first through hole;
   a second insulating layer disposed on a side surface of the second metal layer away from the first substrate and extending to cover the first insulating layer, wherein a position of the second insulating layer corresponding to the second metal layer is defined with at least one second through hole, and an upper surface of the second insulating layer in the transfer pad region is flush with an upper surface of the second insulating layer in the bus line region; and
   a first electrode layer disposed and extending continuously on a side surface of the second insulating layer in the transfer pad region away from the first substrate and electrically connected to the second metal layer through the second through hole,
   wherein a distance between an upper surface of the second insulating layer in the bus line region and an upper surface of the first substrate is less than a maximum distance between an upper surface of the first electrode layer in the transfer pad region and the upper surface of the first substrate.

9. The electronic display device according to claim 8, wherein a projection of the first through hole on the first substrate and a projection of the second through hole on the first substrate comprising a gap.

10. The electronic display device according to claim 8, wherein the display panel further comprises:
   a second substrate disposed opposite to the first substrate and positioned on a side of the first electrode layer away from the first substrate;
   a light-shielding layer disposed on a side surface of the second substrate adjacent to the first substrate; and
   a second electrode layer disposed on a side surface of the light-shielding layer adjacent to the first substrate.

11. The electronic display device according to claim 10, wherein the display panel further comprises:
   a sealant disposed between the first electrode layer and the second electrode layer, wherein the sealant comprises a plurality of conductive balls, and a diameter of each of the conductive balls is equal to a minimum distance between the first electrode layer and the second electrode layer.

12. The electronic display device according to claim 8, wherein a thickness of the second metal layer ranges from 0.5 µm to 0.75 µm.

13. The electronic display device according to claim 8, wherein a thickness of the first electrode layer ranges from 0.08 µm to 0.15 µm.

14. The electronic display device according to claim 8, wherein the display panel further comprises:
   a passivation layer disposed between the second metal layer and the second insulating layer and extending to cover the first insulating layer, wherein the passivation layer is defined with at least one third through hole corresponding to the second through hole.

* * * * *